Feb. 23, 1960 R. B. McDOWELL 2,926,231
METHOD AND APPARATUS FOR SOLDERING
Filed April 11, 1958 2 Sheets-Sheet 1
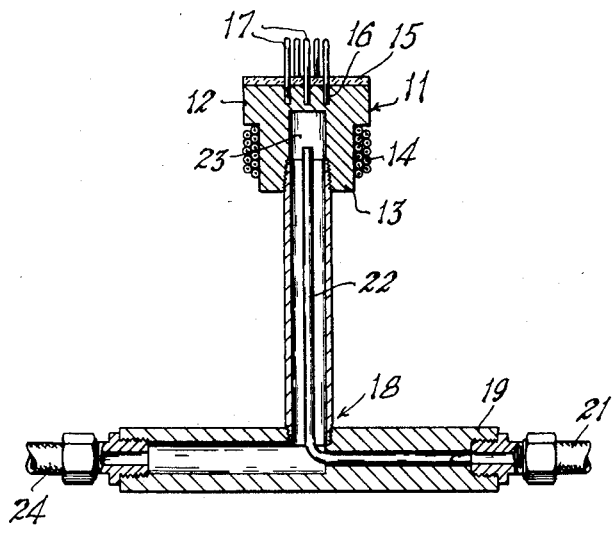
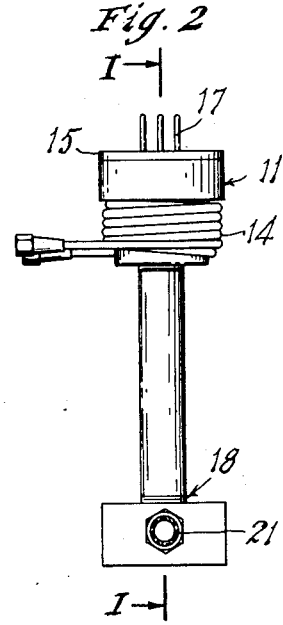
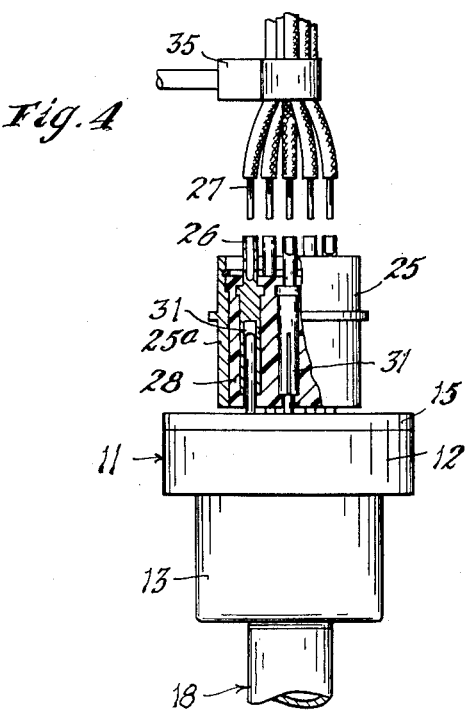
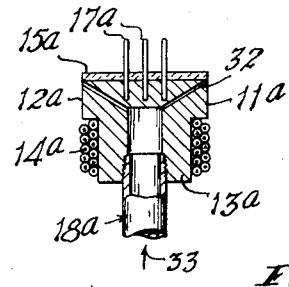
INVENTOR.
Robert B. McDowell
BY Harry B. Keck
ATTORNEY

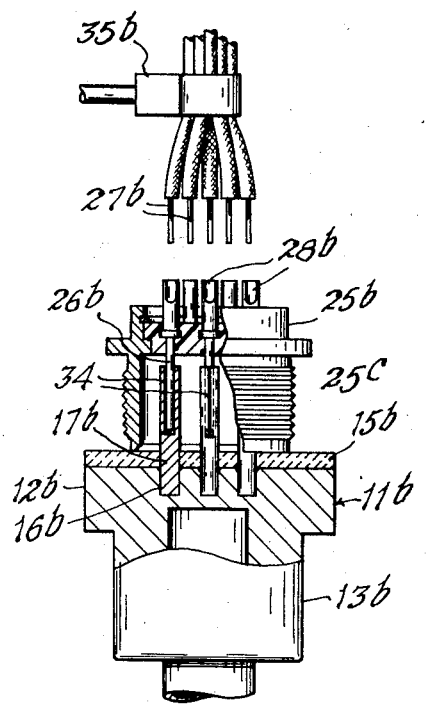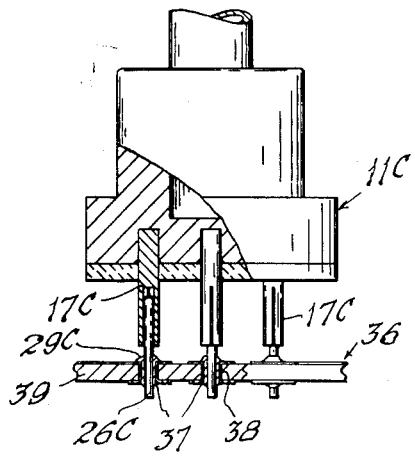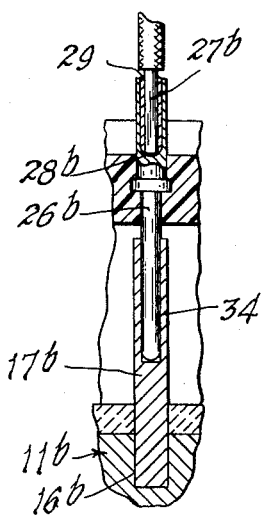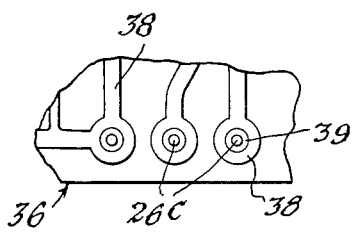

United States Patent Office 2,926,231
Patented Feb. 23, 1960

2,926,231

METHOD AND APPARATUS FOR SOLDERING

Robert B. McDowell, Metuchen, N.J.

Application April 11, 1958, Serial No. 727,917

4 Claims. (Cl. 219—9.5)

This invention relates to a method of heating a plurality of workpieces and, more particularly, to such a method and apparatus for electrically heating, inductively or conductively, a plurality of workpieces of heat-conductive material, whereby, for example lead wires may be soldered to workpieces such as terminal pins.

According to known practice, in the manufacture of devices which have terminals to which leads or wires are to be soldered, for example electrical connectors of the plug-type, feed-through type, and pin contacts such as found in printed circuitry, the two parts to be soldered together are held in contact with each other and soldered. For example, lead wires have been soldered to terminal elements or contacts individually by heated soldering irons or the like to melt the connecting solder which may be on the leads or on the terminals or on both. Such a method of soldering is not altogether satisfactory because it requires too much time and skill.

In accordance with my invention, heat is generated by a work coil, desirably using power from a radio frequency induction heating generator, or by means of resistance heating. In both instances, the heat can be closely controlled and is conducted to such terminals when telescoped with respect to heat-transfer devices, which devices may be in the form of pins or sockets, depending on the form of the workpieces or terminals. Such heat-transfer devices are essential parts of the heat-introducing means and are fitted in pockets in a head formed as a relatively massive electro-conductor. The head is desirably of corrosion-resisting metal, such as stainless steel or a base metal plated with corrosion-resisting material, such as a noble metal or alloy, which plating serves to maintain the surfaces free from oxide.

An object of the invention is to provide a method of simultaneously heating a plurality of workpieces of electrical and heat-conducting material wherein each workpiece is arranged in heat conducting relation to one of a plurality of heat conductive heat-transfer members, and said heat-transfer members are simultaneously heated so that the workpieces are heated by conduction of heat thereto from said transfer members.

Another object of my invention is to provide a massive body of electrical and heat conductive material having electrical heating means associated therewith and heat-transfer members in the form of either pins or sockets carried by said body, which devices serve to transfer heat to workpieces in the form of contact members, which may be contact members or terminal connectors of the plug-type, feed-through connectors, printed circuits and the like, and which are held in heat-conducting relation to said transfer members, without excessively heating the outer shell or inner insulating material of the plug connector, or other devices of which the workpiece is a part.

A further object of my invention is to provide an apparatus as above described, in which the head of the electroconductor is enlarged and carries an insulating disk to shield the work, and wherein means, such as liquid or air, is provided for alternately cooling said conductor.

A still further object of my invention is a method involving the use of the apparatus above disclosed, wherein leads may thereby be soldered to workpieces, such as contact members, when telescoped with respect to the heat-transfer devices, said soldering being effected by having the contact devices hold such solder or by "tinning" the leads or coating them with solder. The heating operation which melts the solder, is alternated with a cooling action which causes solidification of said solder, prior to removal of said contact members from the heat-transfer devices, prior to a repetition of the operation upon a substitution of other contact devices for connection with other leads.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 1 is a fragmentary axial sectional view, on the line I—I of Figure 2 in the direction of the arrows, certain parts being shown in elevation, and means for circulating a cooling liquid being illustrated.

Figure 2 is an elevational view, from the right of the device shown in Figure 1, a part being shown in transverse section.

Figure 3 is a fragmentary plan of the device shown in Figures 1 and 2.

Figure 4 is an enlarged front elevational view with parts in axial section like Figure 1, of the top portion of the device shown in the preceding figures, in which the heat-transfer means are prongs for telescoping with socketed contacts of the workpiece with which associated, in this instance a plug-type feed-through contact device, and a corresponding number of leads arranged for connection thereto.

Figure 5 is a view corresponding to the top portion of Figure 1, but showing the apparatus adapted for cooling by means of air or other gas.

Figure 6 is a view corresponding to Figure 4, but showing parts of the head in axial section to indicate that it is hollow for a reception of a cooling medium, in which the heat-transfer means are sockets instead of prongs for telescoping with pronged contacts of a workpiece, instead of socketed contacts thereof.

Figure 7 is an enlarged fragmentary axial sectional view, with parts in elevation, of a part of the apparatus shown in Figure 6, showing only one of the leads received in the socket of a terminal and connected thereto by means of solder.

Figure 8 is a view of the heating apparatus illustrated in Figure 6, inverted for use in soldering terminal contacts to a printed circuit.

Figure 9 is a plan of a printed circuit shown in Figure 8, after the contacts have been soldered thereto.

Referring to the drawings in detail, and first considering the embodiment of my invention illustrated in Figures 1 to 4, inclusive, there is shown a heat-transfer head 11, desirably relatively massive and formed of electro-conductive material desirably having good heat-conducting properties. It is also desirably made of material which resists oxidation upon heating, and for that reason, may be formed of such material as stainless steel. As an alternative, copper or similar other base metal, plated with one of the noble elements or alloys may be used.

As hereinbefore indicated, the apparatus is designed particularly for use in soldering lead wires to the contact elements of an electrical connector that includes a body of insulation carrying the contact members enclosed in a shell, and one end of the head 11 is of a shape approximately corresponding to the shape of the connector element. As shown, the head 11 is desirably generally circular in cross-section, comprising an outer end portion 12 of larger diameter than the other end portion 13, which extends downwardly therefrom, as viewed in Figures 1, 2 and 4. The portion 12 is also larger in diameter than the connector and serves to shield the shell of the connector carrying the parts to be soldered, from the magnetic field of the work coil when induction heating is used. Mounted on the extension 13, is a coil of insulated tubing 14 which may serve for the introduction of heat to the head 11, as by means of induction, as when alternating current of high frequency, such as radio frequency, is fed thereto as from a suitable generator. As an alternative to the induction heating, resistance heating may be employed in which case two electrodes will be used in place of the work coil. The electrodes are held by pressure in positive contact with the heat transfer head 11, and the amount of resistance of the heat transfer head will determine the amount of current applied by said electrodes to heat the transfer head to the desired temperature.

The enlarged part 12 of the head 11 is desirably covered by a sheet or plate 15 of a ceramic, "Mycalex," "Transite" or other heat-insulating non-metallic material. The head 11 has upwardly or outwardly opening pockets 16 in which are telescoped the adjacent end portions of heat-transfer devices 17, here shown as pins or prongs. These pins also pass through corresponding apertures in the insulating sheet 15, which restricts heat-transfer to the shell and insulation while the workpieces are being soldered.

Means for quickly cooling the head 11 are provided. The cooling means of the present embodiment takes the form of an inverted hollow T-shaped member 18. The stem of said member is fitted within and secured to the extension 13 of the head in any suitable manner, such as brazing or by being screw-threaded into the member 18. At one end the portion 19 of the member 18 is connected to a source of cooling liquid, such as water, as by means of a tube 21. Such water may be conducted by an internal tubular extension 22 to a position about midway of the chamber 23 in the head 11, so that such cooling liquid may be squirted into said head for an alternate cooling operation, an exhaust line allowing the water to drain therefrom around the extension 22 and out of a drainage pipe or tube 24.

Figure 4 shows how a multiple-connector plug 25 may have its contact sockets 26 soldered to a corresponding number of lead wires 27, bunched and supported as by means of a hanger or bracket 35. The plug 25 comprises an outer shell 27, which may be formed of metal, and an insulating core 28 in which are embedded a plurality of, in this instance seven, socketed contact terminals 26. Each terminal, in this instance, has a downwardly opening split socket contact 31, which provides for resiliently gripping one of the heat-transfer pins 17, upon being telescoped thereover, as to the position illustrated in Figure 4. The other end of each contact terminal 26 has an upwardly-opening pocket, forming a socket for the reception for one of the leads 27. Each lead 27 is here shown as having its lower end portion bared or stripped of insulation and "tinned" by being coated with solder. As an alternative to the "tinning" of the leads, the interior of the sockets in the terminals 26 may be coated with solder or "tinned."

Referring now to the embodiment of my invention illustrated in Figure 5, there is shown a head 11a formed, like the head 11 of Figures 1 to 4 inclusive, with an axial extension 13a surrounded by a coil 14a for heating by induction or conduction and an enlarged part 12a covered by a sheet 15a of heat-insulating material into which extend heat-transfer pins or other such devices 17a. In this instance, however, the head has outlet ports 32 through which air may be exhausted after cooling air has been introduced through the cooling attachment 18a in the direction of the arrow 33. This air cooling alternative is not as rapid as cooling by liquid; however such could be used where time is unimportant and the functioning of the soldering technique is not contingent upon the use of cooling liquid.

Referring now to the embodiment of my invention illustrated in Figures 6 and 7, there is shown a heat-transfer head 11b desirably relatively massive and formed of electroconductive material desirably having good heat conducting properties. The head is also, as in the previous instances, desirably made of material which resists oxidation upon heating.

Said head 11b, as in the previous instances, is desirably generally circular in cross-section, comprising an outer end portion 12b of larger diameter than the other end portion 13b which extends axially therefrom. Mounted on the extension 13b may be a coil like the coil 14 of Figures 1, 2, 4 and 5, but not here illustrated, and which may serve for heating as previously described. The enlarged part 12b is also desirably covered by a sheet or plate 15b of heat-insulating non-metallic material, like the sheets 15 and 15a previously described.

The head 11b has upwardly or outwardly opening pockets 16b in which are telescoped, in the present embodiment, the adjacent end portions of heat-transfer devices 17b, here shown as pins with upwardly or outwardly opening sockets 34. These pins also pass through corresponding apertures in the insulating sheet 15b, which assists the enlarged portion 12b in restricting heat-transfer to the workpieces being soldered or heated. Means for quickly cooling the head 11b are provided and may take the form illustrated in Figures 1 and 2, using liquid for cooling, or that illustrated in Figure 5, for air cooling. The details, however, are not here illustrated as they would be duplications.

There is here shown how a multiple-connector plug 25b may have its contact prongs 26b (instead of the contact sockets 26 of the preceding embodiment) soldered to a corresponding numbers of wires or leads 27b, bunched together and supported as by means of a hanger or bracket 35b. The plug 25b comprises an outer shell 27b, which may be formed of metal, and an insulating core 28b in which are embedded a plurality of, in this instance seven, prong contact terminals 26b. Each terminal in this instance has a downwardly extending prong which is resiliently or frictionally gripped in one of the heat-transfer devices 16b, upon being telescoped therein.

The other end of each contact terminal 26b, has an upwardly or outwardly opening pocket, forming a socket for the reception of one of the leads 27b. Each lead 27b is shown as having its lower end portion bared or stripped of its insulation and "tinned" by being coated with solder. As an alternative, the interior of the pockets in the terminals 26b may be coated with solder, or, if desired, both the stripped leads and the pockets may be "tinned" or coated wtih solder.

Figure 7 shows an enlargement of one of the elements of Figure 6 wherein a contact terminal 26b has its lower or prong portion telescoped in an upwardly-opening pocket in a heat-transfer device 17b extending from the head 11b. In this instance, the position of the parts is after soldering has been effected, that is after a lead 27b has been inserted in the upwardly opening pocket of a contact prong 26b and connected thereto by means of solder 29, after a necessary transfer of heat from the supporting head 11b.

Referring now to the embodiment of my invention illustrated in Figures 8 and 9, there is shown a head 11c which may be identical to the head 11b and carry similar heat-transfer devices 17c in a similar manner, except that it is here shown inverted as compared with Figure 6. Each device 17c is, when in use, telescoped over the upper end portion of a contact element or prong 26c. The arrangement of this embodiment is for soldering such contact prongs 26c to a printed circuit 36, specifically in apertures 37 through elements 38 of said circuit and the insulating plate 39 on which the circuit is printed. The application of solder 29c for the purpose of uniting the prongs 26c to the circuit may be effected in any desired manner, as by prior "tinning" of the prongs or the application of solder to the circuit at the points at which the connections are to be made.

Operation

In all the embodiments the operation of heating is effected by electrically energizing the coil which surrounds the extension of the head 11, 11a, 11b or 11c, as the case may be. This effects an induction of heat in the head, or a conduction of heat thereto, from which heat is conducted through the heat-transfer devices 17, 17a, 17b or 17c, to the corresponding contact elements telescoped therewith. This conduction of heat continues until the contact elements reach a soldering temperature, for example from 400° to 500° F., whereupon the solder, applied as "tinning" on the leads, contact pins, or printed circuit, for example, is melted and effects a connection of the engaged parts by soldering.

It is desirable, to quickly cool the parts after the solder has melted, for an economy in time and so as to avoid undue transfer of heat to the connector plug 25, 25b, or associated parts, as the case may be. For this reason, immediately after the solder has melted and connected the parts, cooling fluid is applied as by means of a T-shaped device 18, such as illustrated in Figures 1 and 3, or by means of an air connection, such as illustrated in Figure 5. Thus a cooling fluid is caused to circulate through the head 11, 11a, 11b or 11c, as the case may be. After the necessary period of time for solidifying the solder, the circulation of cooling fluid is discontinued, the contact elements removed from telescopic relation with respect to the heat-transfer elements, and a new set of contact elements telescoped with such heat-transfer elements for repetition of the operations.

From the foregoing disclosure, it will be seen that I have devised a method and apparatus for simultaneously making a plurality of soldered connections to a variety of plugs, connectors, pin contacts and the like, while avoiding the disadvantages and inefficiencies of prior art methods, and all times maintaining accurate control over the operation.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. Apparatus for soldering lead wires to contact members in an electrical connector that are mounted in a body of insulation, comprising an electrical and heat-conductive head, a support therefor, electrical heating means associated with one end of said head capable of heating said head to a temperature at which solder melts, the end of said head opposite said heating means having a plurality of heat-transfer devices projecting therefrom in heat-conducting relation thereto, each to telescopically receive one of said contact members in heat-conducting relation thereto, means for introducing electrical current into said heating means, said head having a chamber therein, and means for passing a cooling fluid through said chamber to cool said head to a temperature at which solder solidifies.

2. Apparatus as defined in claim 1 with the addition of a radio frequency induction coil encircling the end portion of said head opposite said heat-transfer members, and the end of said head from which project said heat-transfer members is of larger diameter than said coil and said electrical connector to shield the connector from the magnetic field of said coil.

3. Apparatus for soldering wires to contact members in an electrical connector that are mounted in a body of insulation, comprising an electrical and heat-conductive head having a plurality of heat-transfer members projecting from one end thereof in heat-conductive relation thereto, each formed to telescopically receive one of said contact members in heat-conductive relation thereto, a support for holding said head with said heat-transfer members projecting upwardly, said head having a chamber therein, electrical heating means associated with the other end of said head capable of heating the head to a temperature at which solder melts, and means including a passage through said support and into said chamber for passing a cooling fluid through said chamber to cool said head to a temperature at which solder solidifies.

4. Apparatus as defined in claim 1 wherein the end of said head from which project said heat-transfer members has a layer of heat insulating material through which said heat-transfer members extend to limit heat transfer from the head to the insulation of the connector.

References Cited in the file of this patent

UNITED STATES PATENTS

| | | |
|---|---|---|
| 2,116,562 | Cruser | May 10, 1938 |
| 2,262,901 | Murphy | Nov. 18, 1941 |
| 2,264,004 | Patterson et al. | Nov. 25, 1941 |
| 2,562,821 | Rothweiler | July 31, 1951 |
| 2,725,505 | Webster | Nov. 29, 1955 |
| 2,876,328 | Bohannon | Mar. 3, 1959 |